(12) United States Patent
Gunn et al.

(10) Patent No.: US 7,203,577 B2
(45) Date of Patent: Apr. 10, 2007

(54) METHODS AND SYSTEMS FOR DISPLAYING THE SOURCE OF AIRCRAFT CONTROL INSTRUCTIONS

(75) Inventors: Peter D. Gunn, Seattle, WA (US); John Wiedemann, Seattle, WA (US); John C. Griffin, III, Seattle, WA (US); Jason L. Hammack, Seattle, WA (US)

(73) Assignee: The Boeing Company, Chicago, IL (US)

( * ) Notice: Subject to any disclaimer, the term of this patent is extended or adjusted under 35 U.S.C. 154(b) by 390 days.

(21) Appl. No.: 10/881,024

(22) Filed: Jun. 30, 2004

(65) Prior Publication Data

US 2006/0004498 A1  Jan. 5, 2006

(51) Int. Cl.
*G06F 17/00* (2006.01)
*G05D 1/00* (2006.01)

(52) U.S. Cl. ............. 701/3; 701/4; 701/14; 701/211; 715/822; 340/967

(58) Field of Classification Search ............ 701/3, 701/4, 8, 14, 211; 715/855, 805, 851, 822; 340/970, 974, 967

See application file for complete search history.

(56) References Cited

U.S. PATENT DOCUMENTS

| | | | |
|---|---|---|---|
| 3,191,147 A | 6/1965 | Majendie | |
| 4,196,474 A | 4/1980 | Buchanan et al. | |
| 4,212,064 A | 7/1980 | Forsythe | |
| 4,247,843 A | 1/1981 | Miller | |
| 4,274,096 A | 6/1981 | Dennnison | |
| 4,325,123 A | 4/1982 | Graham | |
| 4,631,678 A | 12/1986 | Angermuller et al. | |
| 4,792,906 A | 12/1988 | King | |
| 4,860,007 A | 8/1989 | Konicke | |
| 4,899,284 A | 2/1990 | Lewis | |
| 5,050,081 A | 9/1991 | Abbott et al. | |
| 5,070,458 A | 12/1991 | Gilmore et al. | |
| 5,243,339 A * | 9/1993 | Graham et al. | ............. 340/945 |
| 5,329,277 A | 7/1994 | Dougan et al. | |
| 5,337,982 A | 8/1994 | Sherry | |
| 5,420,582 A | 5/1995 | Kubbat | |

(Continued)

FOREIGN PATENT DOCUMENTS

DE  3315386 A  10/1984

(Continued)

OTHER PUBLICATIONS

U.S. Appl. No. 10/860,760, Sikora et al.

(Continued)

*Primary Examiner*—Tan Q. Nguyen
(74) *Attorney, Agent, or Firm*—Perkins Coie LLP

(57) ABSTRACT

Methods and systems for displaying the source of aircraft control instructions are disclosed. A method in accordance with one embodiment to the invention includes receiving a first target to which an aircraft will be automatically directed upon authorization from an operator, and receiving a second target to which the aircraft will automatically be directed upon meeting a threshold condition. The method can further include displaying the first and second targets at least proximate to each other, with a target to which the aircraft is currently being controlled being displayed in a different manner than a target to which the aircraft is not currently being controlled.

40 Claims, 5 Drawing Sheets

U.S. PATENT DOCUMENTS

| | | | |
|---|---|---|---|
| 5,454,074 A | | 9/1995 | Hartel |
| 5,499,025 A | | 3/1996 | Middleton et al. |
| 5,523,949 A | * | 6/1996 | Agate et al. ............... 701/17 |
| 5,668,542 A | | 9/1997 | Wright |
| 5,715,163 A | | 2/1998 | Bang |
| 5,739,769 A | | 4/1998 | Vladimir |
| 5,844,503 A | * | 12/1998 | Riley et al. ............... 340/945 |
| 5,875,998 A | | 3/1999 | Gleine |
| 5,940,013 A | | 8/1999 | Vladimir et al. |
| 5,978,715 A | * | 11/1999 | Briffe et al. ............... 701/11 |
| 6,057,786 A | | 5/2000 | Briffe |
| 6,085,129 A | | 7/2000 | Schardt |
| 6,098,014 A | | 8/2000 | Kranz |
| 6,112,141 A | | 8/2000 | Briffe |
| 6,118,385 A | | 9/2000 | Leard |
| 6,188,937 B1 | | 2/2001 | Sherry |
| 6,246,320 B1 | | 6/2001 | Monroe |
| 6,262,720 B1 | | 7/2001 | Jeffrey |
| 6,275,172 B1 | * | 8/2001 | Curtis et al. ............... 340/961 |
| 6,278,913 B1 | | 8/2001 | Jiang |
| 6,313,759 B1 | | 11/2001 | Musland-Sipper |
| 6,314,366 B1 | | 11/2001 | Farmakis et al. |
| 6,346,892 B1 | | 2/2002 | DeMers et al. |
| 6,362,750 B1 | | 3/2002 | Castor |
| 6,381,519 B1 | | 4/2002 | Snyder |
| 6,389,333 B1 | | 5/2002 | Hansman |
| 6,443,399 B1 | | 9/2002 | Yount et al. |
| 6,473,675 B2 | * | 10/2002 | Sample ............... 701/3 |
| 6,542,796 B1 | | 4/2003 | Gibbs et al. |
| 6,556,902 B2 | | 4/2003 | Ing |
| 6,633,810 B1 | | 10/2003 | Qureshi et al. |
| 6,636,786 B2 | | 10/2003 | Partel |
| 6,745,113 B2 | | 12/2003 | Griffin |
| 6,697,718 B2 | | 2/2004 | Le Draoullec et al. |
| 6,720,891 B2 | | 4/2004 | Chen |
| 6,753,891 B1 | | 6/2004 | Chohan et al. |
| 6,870,490 B2 | * | 3/2005 | Sherry et al. ............... 340/970 |
| 2002/0004695 A1 | | 1/2002 | Glenn et al. |
| 2002/0016654 A1 | | 2/2002 | Ing et al. |
| 2002/0033837 A1 | | 3/2002 | Munro |
| 2003/0058134 A1 | | 3/2003 | Sherry |
| 2003/0132860 A1 | | 7/2003 | Feyereisen |
| 2003/0225492 A1 | | 12/2003 | Cope et al. |
| 2004/0059474 A1 | | 3/2004 | Boorman |
| 2004/0111192 A1 | | 6/2004 | Naimer et al. |
| 2004/0183697 A1 | | 9/2004 | Rogers et al. |
| 2004/0254691 A1 | | 12/2004 | Subelet |
| 2006/0004496 A1 | | 1/2006 | Tucker et al. |

FOREIGN PATENT DOCUMENTS

| | | |
|---|---|---|
| EP | 0 286 120 | 10/1988 |
| EP | 0 370 640 | 5/1990 |
| EP | 0 489 521 | 11/1991 |
| FR | 2817831 | 6/2002 |
| FR | 2848306 | 6/2004 |
| GB | 886136 | 1/1962 |
| WO | WO-02/24530 | 3/2002 |
| WO | WO-2004/027732 | 4/2004 |

OTHER PUBLICATIONS

U.S. Appl. No. 10/882,101, Griffin, III et al.
U.S. Appl. No. 10/882,800, Griffin, III et al.
Peugeot 406 Handbook, Automobiles Peugeot, Paris, France, May 14, 1998 (pp. 30 and 38).
Painter et al., "Decision Support For the General Aviation Pilot," Systems, Man, and Cybernetics, IEEE International Conference on Computational Cybernetics and Simulation, Orlando, FL, Oct. 12-15, 1997, pp. 88-93.
Tucker et al., "Enhanced Vertical Situation Display", filed Jun. 30, 2004, 11 pgs.
U.S. Appl. No. 10/746,883, Boorman.
U.S. Appl. No. 10/746,912, Boorman
U.S. Appl. No. 10/787,644, Tafs et al.
U.S. Appl. No. 10/798,588, Griffin, III et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
777 Flight Deck (1 page) http://www.meriweather.com/777/777_main.html [Accessed Jan. 28, 2003].
Hutchins, Edwin, "The Integrated Mode Management Interface," Department of Cognitive Science, University of California, San Diego, Sep. 17, 1996.
Lindenfeld, Ron, "What is an FMS?", Flight Management Systems (5 pages) http://www.ultranet.com/~marzgold/FAQ-FMS.html [Accessed Jun. 3, 2002].
Meriweather's Flight Deck Acronyms & Definitions (4 pages) http://www.meriweather.com/fd/def.html [Accessed Jun. 3, 2002].

* cited by examiner

METHODS AND SYSTEMS FOR DISPLAYING THE SOURCE OF AIRCRAFT CONTROL INSTRUCTIONS

TECHNICAL FIELD

The present invention is directed generally toward systems and methods for displaying the source of instructions for controlling aircraft.

BACKGROUND

Modern commercial aircraft make extensive use of computer systems to control aircraft behavior, plan and execute flights, and manage a myriad of other aircraft operations. Most current commercial transport aircraft include a flight management computer (FMC) that tracks flight segments or "legs" enroute and can automatically control the aircraft to fly some or all of the segments. A control and display unit (CDU) or a similar device is accessible by the pilot for providing input to and receiving output from the FMC. Accordingly, instructions originating from the FMC are typically implemented automatically when the aircraft passes a pre-identified position or meets another pre-identified threshold condition. For example, the FMC can automatically direct the aircraft to climb, descend, or level off at a particular waypoint, or level off to achieve a constraint altitude.

The aircraft described above typically also include a mode control panel (MCP) at which the pilot can enter flight control instructions for controlling an immediately upcoming portion of the flight. An instruction received from the MCP will be automatically implemented once the pilot authorizes implementation (e.g., by pressing a button) and will then not typically be altered until the pilot enters another instruction at the MCP, takes over control of the aircraft manually, or explicitly directs the control to shift to the FMC.

The MCP and the FMC are typically arranged to interact with each other to resolve potentially conflicting instructions provided by each. Accordingly, in many existing arrangements, the FMC will automatically defer to an instruction authorized at the MCP. One potential drawback with this arrangement is that, when the aircraft is being flown automatically, it may not be clear to the pilot whether the instruction that the aircraft is following is received from the FMC or the MCP. Accordingly, it may take the pilot extra time to determine the source of the instruction, which can cause pilot workload inefficiencies.

SUMMARY

The present invention is directed to methods and systems for displaying the source of aircraft control instructions. A computer-implemented method for displaying aircraft control information in accordance with one aspect of the invention includes receiving a first target to which an aircraft will be automatically directed upon authorization from an operator. The method can further include receiving a second target to which the aircraft will be automatically directed upon meeting a threshold condition. The first and second targets can be displayed at least proximate to each other, with a target to which the aircraft is currently being controlled displayed in a different manner than a target to which the aircraft is not currently being controlled. For example, the first target can be a target received from a mode control panel and the second target can be a target received from a flight management computer. The targets can be displayed in different colors to indicate the target to which the aircraft is currently being controlled.

A computer system in accordance with another aspect of the invention includes a receiver portion configured to receive a first target to which an aircraft will be automatically directed upon authorization from an operator, and a second target to which the aircraft will be automatically directed upon meeting a threshold condition. The computer system can further include a display portion configured to display the first and second targets at least proximate to each other, with a target to which the aircraft is currently being controlled being displayed in a different manner than a target to which the aircraft is not currently being controlled.

DETAILED DESCRIPTION

The following disclosure describes systems and methods for displaying aircraft control information (e.g., the source of aircraft control instructions) aboard an aircraft. Certain specific details are set forth in the following description and in FIGS. 1–5G to provide a thorough understanding of various embodiments of the invention. Well-known structures, systems, and methods often associated with handling electronic instructions have not been shown or described in detail below to avoid unnecessarily obscuring the description of the various embodiments of the invention. In addition, those of ordinary skill in the relevant art will understand that additional embodiments of the present invention may be practiced without several of the details described below.

Many embodiments of the invention described below may take the form of computer-executable instructions, such as routines executed by a programmable computer. Those skilled in the relevant art will appreciate that the invention can be practiced on other computer system configurations as well. The invention can be embodied in a special-purpose computer or data processor that is specifically programmed, configured or constructed to perform one or more of the computer-executable instructions described below. Accordingly, the term "computer" as generally used herein includes any processor and can include Internet appliances, hand-held devices (including palm-top computers, wearable computers, cellular or mobile phones, multi processor systems, processor-based or programmable consumer electronics, mini-computers and the like).

The invention can also be practiced in distributed computing environments, in which tasks or modules are performed by remote processing devices that are linked with a communications network. In a distributed computing environment, program modules or subroutines may be located in both local and remote memory storage devices. Aspects of the invention described below may be stored or distributed on computer-readable media, including magnetic or optically readable computer disks (e.g., removable disks) as well as distributed electronically over networks. Data structures and transmissions of data particular to aspects of the invention are also encompassed within the scope of the invention. Information handled in accordance with aspects of the invention can be presented at displays or display media, for example, CRT screens, LCD screens, or other suitable devices.

Figure 1:
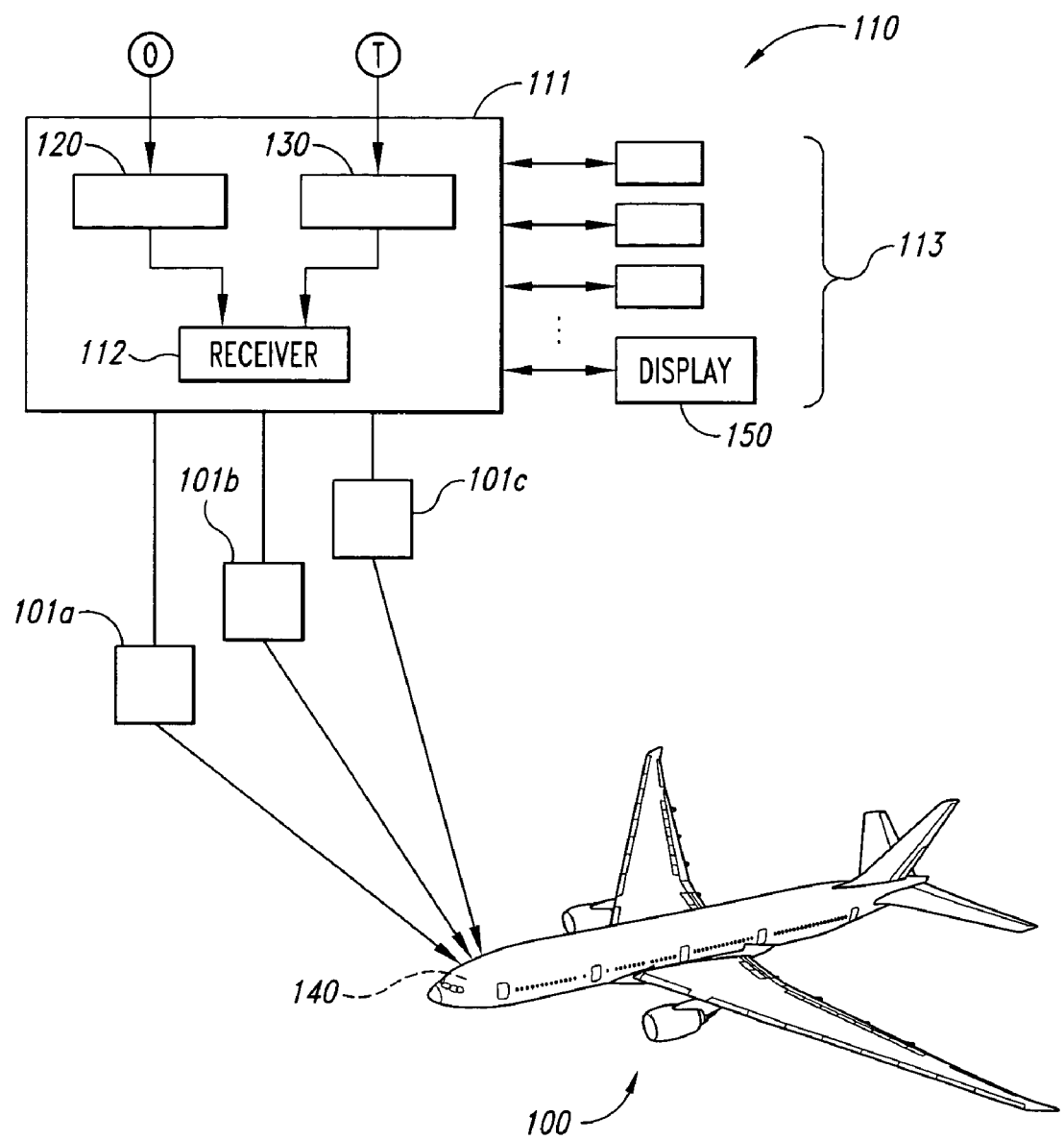
FIG. 1 is a partially schematic illustration of a system that indicates the sources of control instructions for controlling an aircraft in accordance with an embodiment of the invention.

FIG. 1 is a schematic illustration of an aircraft 100 having a system 110 configured to receive, process, and/or display information in accordance with an embodiment of the invention. Portions of the system 110 can be housed at a flight deck 140 of the aircraft 100 for access by an operator (e.g., a pilot). The aircraft 100 can have a fixed wing configuration (as shown in FIG. 1) or other configurations (e.g., rotary wing configurations). In one aspect of this embodiment, the system 110 can include input/output devices 113 via which the operator and/or aircraft subsystems can provide information to a computer (e.g., a flight guidance computer 111). The flight guidance computer 111 can include a processor and memory which can be distributed between a first portion 120 and a second portion 130, both coupled to a receiver portion 112. The first and second portions 120 and 130 can provide aircraft control instructions to the receiver portion, which can then be conveyed to a display 150 that is visually accessible by the operator. Accordingly, the display 150 can present to the operator relevant instructions, as well as the source of the instructions, whether the source includes the first portion 120 or the second portion 130.

In a particular aspect of this embodiment, the first portion 120 can include a mode control panel (MCP) and can accordingly receive authorization to implement control instructions via an operator input 0. The second portion can include a flight management computer or system (FMC or FMS) and can accordingly include a flight plan list of flight segments that are automatically initiated when a threshold condition T is met. In other embodiments, the first portion 120 and the second portion 130 can include other devices and/or arrangements, e.g., the first portion 120 can include autoflight computers, autopilots, and/or autothrottles. In any of these embodiments, the flight guidance computer 111 can be linked to one or more aircraft control systems 101, shown in FIG. 1 as a lateral motion or a roll control system 101a, a vertical motion controller 101b, and an airspeed or engine control system 101c to control the aircraft direction, altitude and speed. The flight guidance computer 111 directs the operation of the control systems 101 either automatically as conditions are met, or automatically upon receiving an authorized input from the operator, or by automatically providing guidance cues to the operator who then manually controls the aircraft 100. Aspects of the manner in which the system 110 displays the source of the instructions for controlling the motion of the aircraft 100 are described in greater detail below with reference to FIGS. 2–5G.

Figure 2:
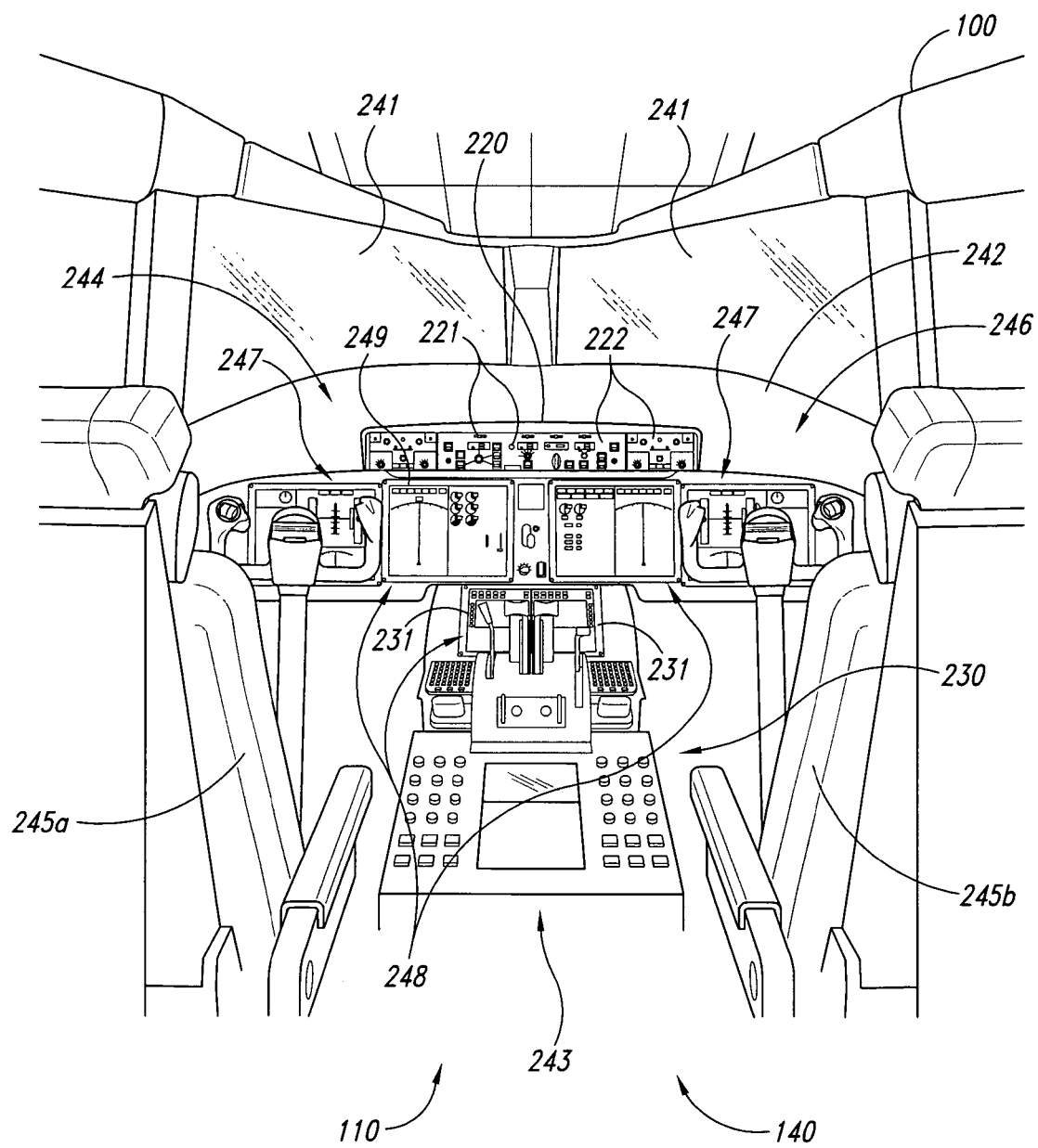
FIG. 2 is a partially schematic illustration of a flight deck in which a system is housed in accordance with an embodiment of the invention.

FIG. 2 illustrates details of the flight deck 140, which provides an environment in which the system 110 operates in accordance with an embodiment of the invention. The flight deck 140 can include forward windows 241 providing a forward field of view from the aircraft 100 for operators seated in a first seat 245a and/or a second seat 245b. In other embodiments, the forward windows 241 can be replaced with one or more external vision screens that include a visual display of the forward field of view out of the aircraft 100. A glare shield 242 can be positioned adjacent to the forward windows 241 to reduce the glare on one or more flight instruments 244 positioned on a control pedestal 243 and a forward instrument panel 246.

The flight instruments 244 can include primary flight displays (PFDs) 247 that provide the operators with actual flight parameter information, and multifunction displays (MFDs) 248 that display other operator-selectable information. For example, one or more of the MFDs 248 can present a navigation display 249 containing navigational information. The flight guidance computer 111 described above with reference to FIG. 1 can include several linked and/or unlinked computers, including a flight management computer (FMC) 230. The FMC 230 can receive and present information via a conventional control and display unit (CDU) or an emulated CDU display field 231, such as is described in co-pending U.S. application Ser. No. 10/814,369, incorporated herein in its entirety by reference. The flight guidance computer 111 can also include a mode control panel (MCP) 220 having input devices 221 for receiving inputs from operators, and a plurality of displays 222 for providing flight control information to the operators. As described in greater detail below, the system 110 can more clearly attribute flight control information to either the MCP 220 (corresponding in this embodiment to the first portion 120 described above with reference to FIG. 1) or the FMC 230 (corresponding in this embodiment to the second portion 130) than do existing flight computers.

Figure 3:
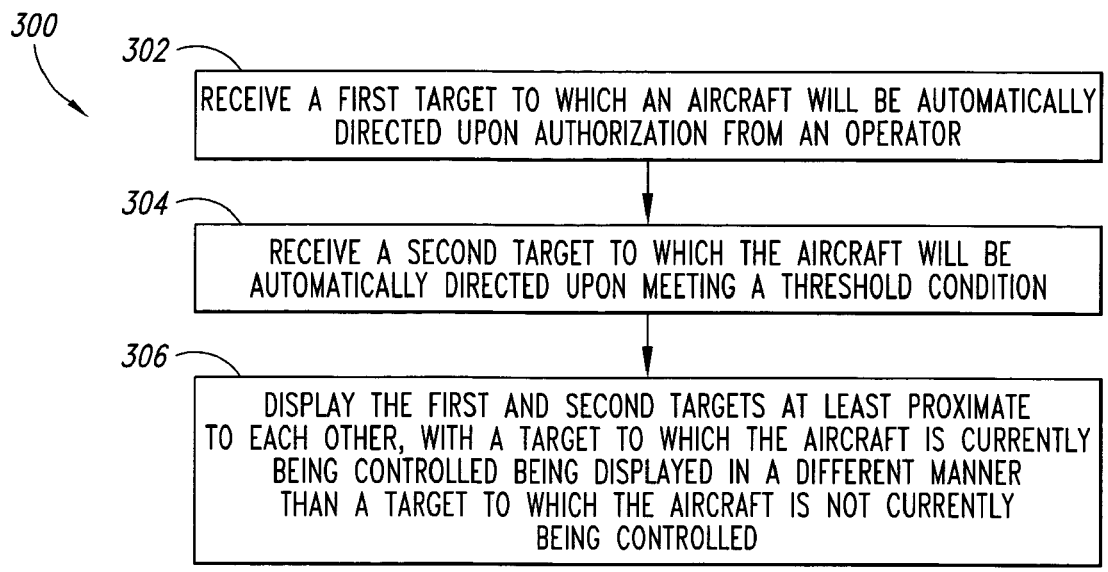
FIG. 3 is a flow diagram illustrating a process for displaying aircraft control instructions in accordance with an embodiment of the invention.

FIG. 3 is a flow diagram illustrating a process 300 for handling aircraft control information in accordance with an embodiment of the invention. The process 300 can include receiving a first target to which an aircraft will be automatically directed upon authorization from an operator (process portion 302). For example, the first target can include an altitude target received from the MCP 220 (FIG. 2). In process portion 304, the system 110 (FIG. 1) can receive a second target to which the aircraft will be automatically directed upon meeting a threshold condition. For example, the second target can correspond to a cruise altitude or a constraint altitude received from the FMC 230 (FIG. 2). In process portion 306, the first and second targets are displayed at least proximate to each other with a target to which the aircraft is currently being controlled displayed in a different manner than a target to which the aircraft is not currently being controlled. Because the (at least) two targets are displayed at least proximate to each other but in different manners, this arrangement can provide the operator with a clear indication of the targets to which the available controlling authorities are currently set, and which of these authorities is currently guiding the motion of the aircraft.

Figure 4:
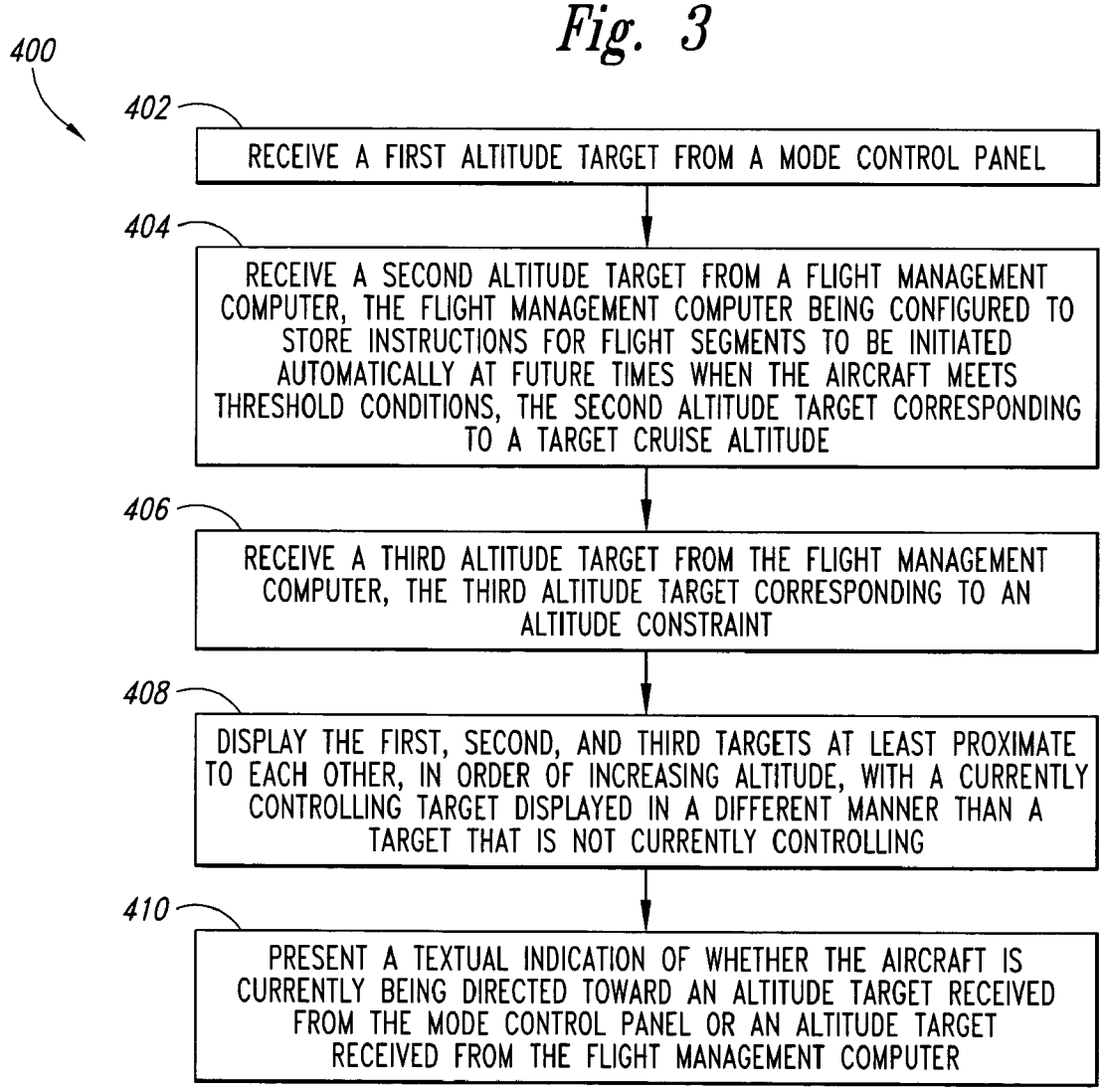
FIG. 4 is a flow diagram illustrating a process for displaying aircraft control instructions in accordance with another embodiment of the invention.

FIG. 4 illustrates further aspects of a process 400 for displaying aircraft control instructions, in accordance with another embodiment of the invention. In one aspect of this embodiment, the process 400 includes receiving a first altitude target from an MCP (process portion 402) and receiving a second altitude target from an FMC, which is configured to store instructions for flight segments to be initiated automatically at future times once the aircraft meets threshold conditions (process portion 404). The second altitude target corresponds to a target cruise altitude. In process portion 406, the system receives a third altitude target from the FMC, the third altitude target corresponding to an altitude constraint. The first, second and third targets are displayed at least proximate to each other, in order of increasing altitude, with a currently controlling target displayed in a different manner than a target that is not currently controlling (process portion 408). Accordingly, the operator can easily determine the order in which the different targets are likely to be met by the aircraft, and which target is currently controlling the motion of the aircraft. In process portion 410, the process further includes presenting a textual indication of whether the aircraft is currently being directed toward an altitude target received from the MCP or an altitude target received from the FMC. Accordingly, the textual message can further identify the source of the target to which the aircraft is currently being controlled.

FIGS. 5A–5G illustrate a display 150 (e.g., a display page) presenting information in accordance with several aspects of the invention. The display 150 can be presented at any of the display media described above with reference to FIG. 2, e.g., the primary flight displays (PFDs), the multifunction displays (MFDs), or the control and display units (CDUs).

Figure 5A:
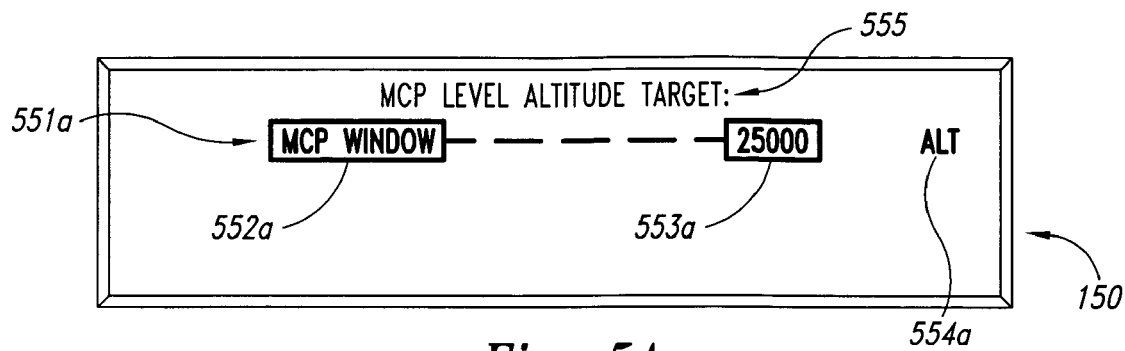
FIGS. 5A–5G illustrate displays presenting aircraft control information in accordance with further embodiments of the invention.

Beginning with FIG. 5A, an embodiment of the display 150 includes a current mode indicator 555 and a first target display field 551a. The current mode indicator 555 shown in FIG. 5A indicates that the aircraft is in an MCP mode and is being directed to a level altitude target. The first target display field 551a includes a first source indicator 552a, a first target value 553a, and a first mode indicator 554a. These three elements can be positioned at roughly the same vertical position of the display 150 to highlight their relationship to each other. The first source indicator 552a indicates that the source of the first target value 553a is the MCP window. The first mode indicator 554a identifies the mode entered at the MCP for the flight guidance system (e.g., the "ALT" mode).

Because no flight plan data has been entered, no FMC targets are presented at the display 150. Because the aircraft is being controlled to the target indicated at the MCP window (e.g., the numerical value input by the operator and appearing at a display window of the MCP 220 shown in FIG. 2), the first target display field 551a is presented in a particular manner. For example, the alphanumeric characters in the first target display field 551a can be presented in a selected color when the first target display field 551a includes the target to which the aircraft is currently being directed. In other embodiments, these characters can be presented in other distinguishing manners, for example, via different line thicknesses or other font characteristics. For purposes of illustration, the targets are distinguished from each other in FIGS. 5A–5G by different line thicknesses (e.g., bolding).

Figure 5B:
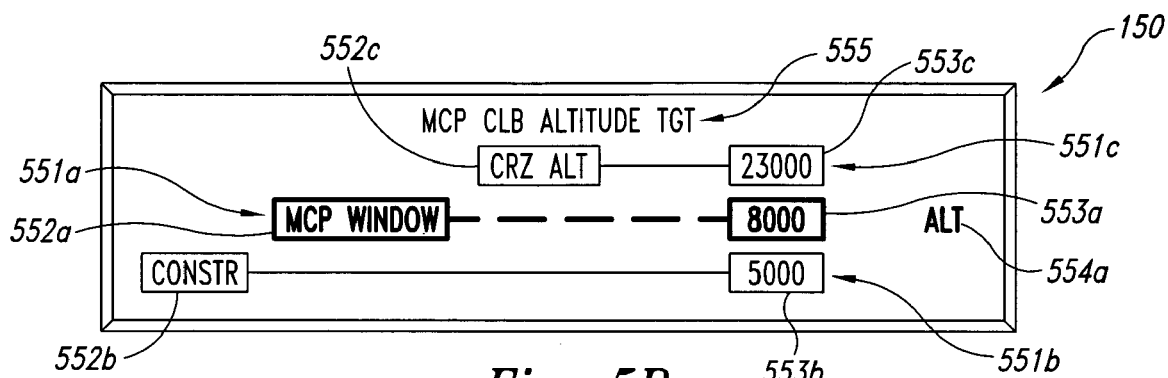

FIG. 5B illustrates the display 150 after an FMC flight plan has been entered and an altitude constraint (e.g., a climb constraint) exits. Accordingly, a second target display field 551b and a third target display field 551c now appear along with the first target display field 551a. The second and third target display fields 551b, 551c present targets provided by the FMC. For example, the second target display field 551b includes a second source indicator 552b that identifies a climb constraint (received from the FMC) as the source of a constrained altitude target value 553b of 5,000 feet. The third target display field 551c includes a third source indicator 552c identifying a cruise altitude (also received from the FMC) as the source for a cruise altitude target value 553c of 23,000 feet.

One characteristic of the arrangement shown in FIG. 5B is that when the aircraft is being automatically directed to a target provided by the MCP window, the first target display field 551a is presented in a manner different than the manner in which the second and/or third target display fields 552b, 552c are presented. For example, the alphanumeric characters in the first target display field 551a are presented in bold type, while the alphanumeric characters presented in the second and third target display fields 551b, 551c are presented in a normal font. As discussed above, the manner in which these fields are distinguished from each other can take other forms (e.g., different colors, different fill characteristics, different font sizes and/or different font styles) in other embodiments. In any of these embodiments, the differences in presentation can make it easier for the operator to readily determine the source of the control instruction.

Another characteristic of the arrangement shown in FIG. 5B is that the target display fields 551a–551c are ordered by the numerical value of the corresponding targets. For example, the second target display field 551b (which has the lowest target value 553b of 5,000 feet) is provided toward the bottom of the display 150, the first target display field 551a (which has the next highest target value 553a of 8,000 feet) is presented above the second target display field 551b, and the third target display field 551c (which has the highest target value 553c of 23,000) is presented above both the first and second target display fields 551a, 551b. An advantage of this arrangement is that it can ease the operator's workload by providing information corresponding to multiple targets at a single location, and organized in an intuitive manner.

Another characteristic of the arrangement shown in FIG. 5B is that the current mode indicator 555 can clearly identify the current flight mode proximate to the available targets. For example, as shown in FIG. 5B, the current mode is an MCP mode in which the aircraft is directed to climb to a target altitude. Accordingly, it is clear to the pilot not only which mode the aircraft is in (e.g., an MCP mode) but also the source of the target to which the aircraft is flying (e.g., the MCP window).

Figure 5C:
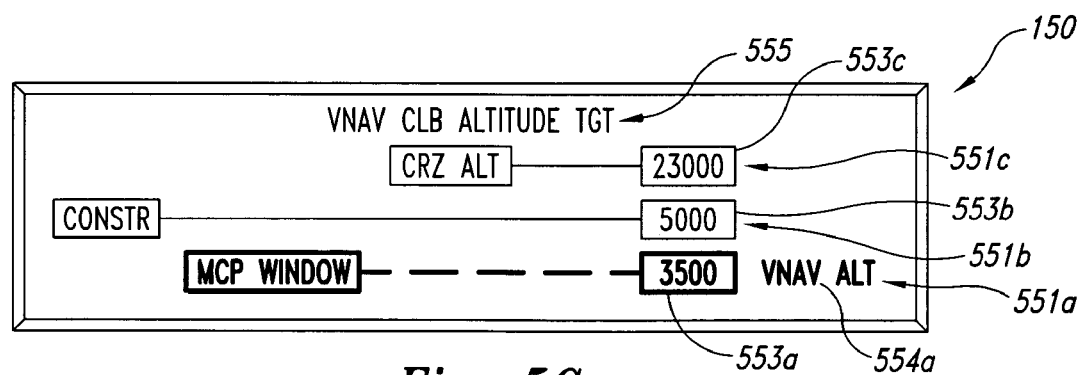

FIG. 5C illustrates the display 150 after the aircraft has entered an FMC mode. Accordingly, the current mode indicator 555 indicates an FMC mode ("VNAV CLB"). However, because an MCP target is still active, the system "defers" to the MCP, as indicated by the highlighted first target display field 551a. As a result, the operator can readily recognize that, although the airplane is being flown in an FMC mode, the current target (3,500 feet) is obtained from the MCP window and that the mode by which the aircraft will achieve that target is an FMC mode that defers to the MCP target ("VNAV ALT"). The operator can also readily recognize that upon re-authorizing the MCP to a higher altitude, the aircraft will climb to a constrained altitude of 5,000 feet and that once the constraint has been eliminated (e.g., by passing a target waypoint), the aircraft will continue to climb to a cruise altitude of 23,000 feet.

Figure 5D:
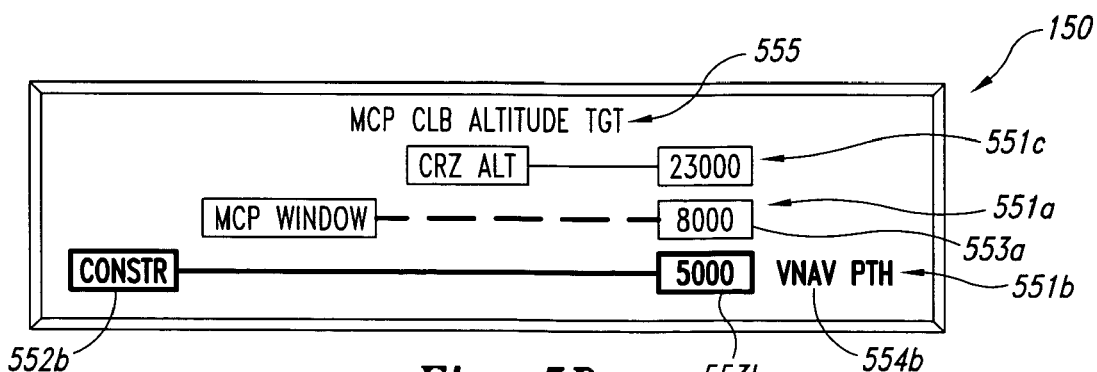

In the foregoing illustrations, the MCP provides the target to which the aircraft is being controlled, (a) because no flight plan has been entered (as shown in FIG. 5A), or (b) because a flight plan had been entered but the FMC mode has not been engaged (FIG. 5B), or (c) because a flight plan has been entered and the FMC mode has been engaged, but the operator has entered and authorized an MCP altitude target below the next FMC altitude target (FIG. 5C). FIG. 5D illustrates the display 150 when an FMC mode is active and when the target value provided at the MCP window has not been authorized by the operator. In this particular embodiment, the second target display field 551b indicates that the aircraft is flying a "VNAV PTH" mode, constrained to an altitude of 5,000 feet. This is the controlling target, as indicated by bold type in FIG. 5D. The first target display field 551a indicates that the MCP window has a value of 8,000 feet as its target. Accordingly, were the operator to activate the target at the MCP window (e.g., by selecting a target altitude, pressing the appropriate switch, or otherwise providing an authorizing input at the MCP), the flight guidance computer would defer to the instruction provided at the MCP window and climb to 8,000 feet.

Figure 5E:
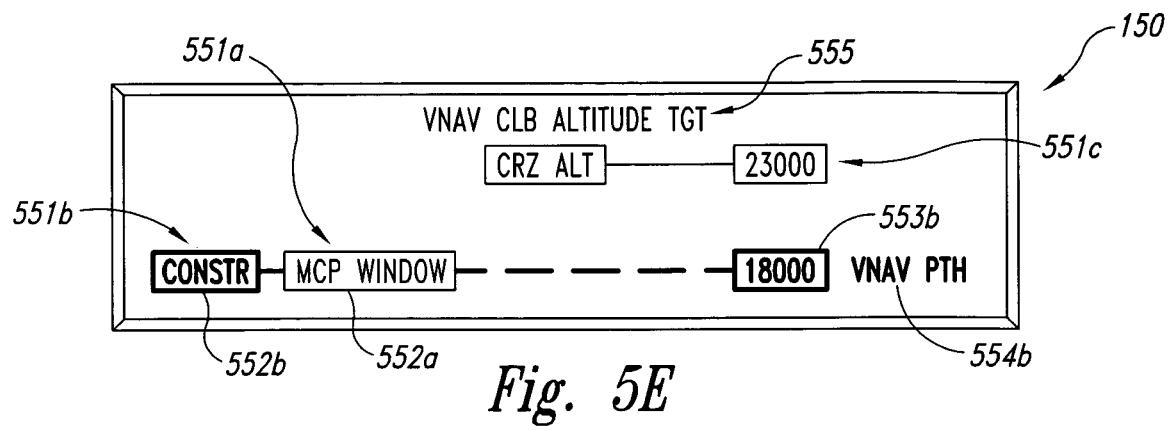

FIG. 5E illustrates the display 150 when the first target display field 551a and the second target display field 551b both have the same target value. In this particular case, the aircraft is being flown in accordance with an FMC "VNAV CLB" mode, constrained to an altitude of 18,000 feet. The first target display field 551a indicates that the MCP window has the same target value of 18,000 feet, but has not been authorized. Accordingly, the first target display field 551a is shown unhighlighted and on the same line as the second target display field 551b (e.g., the first and second target display fields 551a, 551b are vertically aligned). This indicates to the operator that the aircraft is being flown in accordance with instructions received from the FMC, but that if the operator were to engage the MCP (e.g., authorize the MCP window altitude), the aircraft would still fly to an altitude target of 18,000 feet.

Figure 5F:
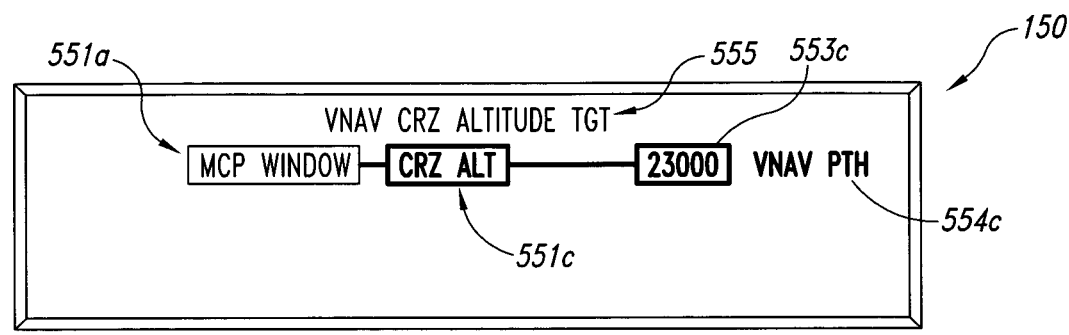

FIG. 5F illustrates the display 150 when the value in the MCP window again coincides with the target value provided by the FMC, in this case, the cruise altitude target. Accordingly, the (active) third target display field 551c is shown highlighted, with the first target display field 551a shown unhighlighted. As is also shown in FIG. 5F, the aircraft has passed above any constraint altitudes and, accordingly, the second target display field 552b shown in FIG. 5E is no longer shown.

Figure 5G:
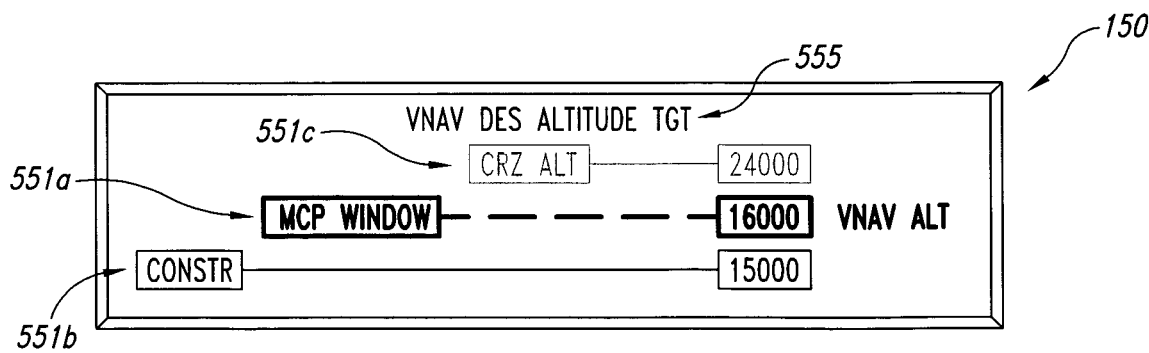

FIG. 5G illustrates the display 150 during aircraft descent. In a particular aspect of this embodiment, the aircraft is being flown automatically via instructions from the FMC, as indicated by the current mode indicator 555, which identifies the mode as "VNAV DES." Because an altitude at the MCP window has been authorized, the flight guidance computer is currently directing the aircraft to the target highlighted at the first target display field 551a. Accordingly, the second target display field 551b appears unhighlighted. In another aspect of this embodiment, the third target display field 551c (representing the FMC cruise altitude value) is presented in yet a different manner to highlight to the operator the fact that the aircraft has left the cruise altitude and is beginning a descent. In one aspect of this embodiment, the alphanumeric characters in the third target display field 551c can be presented in a different font (e.g., light lines) and in other embodiments, the third target display field 551c can be presented in other manners (e.g., a different color).

One feature of embodiments of the systems described above with reference to FIGS. 1–5G is that they can visually highlight the source of the target to which the aircraft is currently being controlled. Accordingly, the operator can more readily understand why the aircraft is behaving in a particular way because the source of the controlling target is more apparent than it is with existing display arrangements.

Another feature of embodiments of the systems described above with reference to FIGS. 1–5G is that targets from different sources can be displayed proximate to each other. Accordingly, the operator can see at a glance which target is active and which target(s) would become active if the operator took a particular action (e.g., engaging the FMC or engaging the MCP). The targets can also be displayed in an order that is intuitive for the operator. For example, altitude targets can be displayed vertically, with higher altitude targets positioned above lower altitude targets. Targets for other aspects of the aircraft's operation can also be presented in an intuitive manner.

Still another characteristic of embodiments of the system described above with reference to FIGS. 1–5G is that they can present currently active modes and currently inactive modes in addition to the currently active target. For example, the current mode indicator 555 described above can indicate to the operator that the aircraft is being flown in an FMC mode while at the same time, the first target display field 551a (if highlighted) can indicate that the current target to which the aircraft is being flown is determined by the MCP. The operator can also understand by viewing the display 150 what mode would be entered if he or she were to authorize the MCP window target (e.g., when the MCP window target is not currently controlling) or return to the flight plan (e.g., when the MCP window target is currently controlling).

An advantage of the foregoing features is that they can more clearly identify to the operator what the aircraft is currently doing, why the aircraft is currently doing so, and what the options are for changing the manner in which the aircraft is controlled. These advantages, alone or in combination, can simplify the operator's workload by reducing the amount of time required by the operator to understand the aircraft's current situation and the options available for changing the aircraft's current situation.

From the foregoing, it will be appreciated that specific embodiments of the invention have been described herein for purposes of illustration, but that various modifications may be made without deviating from the spirit and scope of the invention. For example, many of the features described above in the context of altitude targets can be applied to other targets in other embodiments. In some embodiments, displays presented at a single display medium (e.g., a single LCD screen) can be displayed over multiple display media, with the display media positioned adjacent to or very near each other. Features described in the context of particular embodiments can be combined or eliminated in other embodiments. Accordingly, the invention is not limited except as by the appended claims.

We claim:

1. A computer-implemented method for displaying aircraft control information, comprising:

receiving a first target to which an aircraft will be automatically directed upon authorization from an operator;

receiving a second target to which the aircraft will be automatically directed upon meeting a threshold condition; and displaying the first and second targets at least proximate to each other, with a target to which the aircraft is currently being controlled being displayed in a different manner than a target to which the aircraft is not currently being controlled.

2. The method of claim 1 wherein:

the first target includes a first altitude target received from a mode control panel;

the second target includes a second altitude target corresponding to a cruise altitude received from a flight management computer, and wherein the flight management computer is configured to receive and store instructions for flight segments to be initiated at future times upon meeting threshold conditions; and wherein the method further comprises receiving a third target to which the aircraft will be automatically directed upon meeting a threshold condition, the third target including a third altitude target corresponding to a constraint altitude, the third altitude target being received from the flight management computer; further wherein displaying a target to which the aircraft is currently being controlled in a different manner than a target to which the aircraft is not currently being controlled includes displaying the targets in different colors.

3. The method of claim 1, further comprising changing a manner in which a target is displayed in response to receiving a signal that the aircraft is no longer being controlled to the target.

4. The method of claim 1 wherein receiving a first target includes receiving a first altitude target from a mode control panel, and wherein receiving a second target includes receiving a second altitude target from a flight management computer configured to receive and store instructions for flight segments to be initiated upon meeting threshold conditions.

5. The method of claim 1 wherein displaying the targets includes displaying the targets at a single display medium.

6. The method of claim 1, further comprising displaying a flight mode corresponding to at least one target at least proximate to the at least one target.

7. The method of claim 1, further comprising displaying at least proximate to one of the targets a flight mode according to which the aircraft will be flown if the aircraft is controlled to attain the one target.

8. The method of claim 1 wherein receiving the first target includes receiving the first target from an aircraft mode control panel, and wherein receiving the second target includes receiving the second target from a computer-based flight plan.

9. The method of claim 1 wherein displaying a target to which the aircraft is currently being controlled in a different manner than a target to which the aircraft is not currently being controlled includes displaying the targets in different colors.

10. The method of claim 1, further comprising determining which of the targets the aircraft is currently being controlled to attain.

11. A method for displaying aircraft flight information, comprising:
receiving a first altitude target;
receiving a second altitude target corresponding to a target cruise altitude;
receiving a third altitude target corresponding to an altitude constraint; and
displaying the first, second and third altitude targets at least proximate to each other, with one of the altitude targets to which the aircraft is currently being controlled being displayed in a different manner than another of the altitude targets to which the aircraft is not currently being controlled.

12. The method of claim 11, further comprising changing a manner in which the one altitude target is displayed in response to receiving a signal that the aircraft is no longer being controlled to the one altitude target.

13. The method of claim 11 wherein receiving a first altitude target includes receiving a first altitude target from a mode control panel.

14. The method of claim 11 wherein receiving the second and third altitude targets includes receiving the second and third altitude targets from a flight management computer configured to receive and store instructions for flight segments to be automatically initiated at a future time upon meeting threshold conditions.

15. The method of claim 11 wherein displaying the first, second and third altitude targets includes displaying the altitude targets in an order determined by a numerical value of each target.

16. The method of claim 11 wherein displaying the first, second and third altitude targets includes displaying the altitude targets in an order determined by a numerical value of each target, and wherein the method further comprises re-ordering the targets after at least one of the targets is updated.

17. The method of claim 11 wherein displaying the altitude targets includes displaying the altitude targets at a single display medium.

18. The method of claim 11, further comprising presenting a textual indication of whether the aircraft is currently being directed toward an altitude target received from a mode control panel or an altitude target received from a flight management computer configured to receive and store instructions for flight segments to be initiated at future times upon meeting threshold conditions.

19. The method of claim 11, further comprising displaying at least proximate to one of the targets a flight mode according to which the aircraft will be flown if the aircraft is controlled to attain the one target.

20. The method of claim 11 wherein receiving the first altitude target includes receiving the first altitude target from an aircraft mode control panel, and wherein receiving the second and third altitude targets includes receiving the second and third targets from a computer-based flight plan.

21. The method of claim 11 wherein displaying the one altitude target in a different manner than the other altitude target includes displaying the one altitude target in a different color than the other.

22. The method of claim 11, further comprising displaying the first, second and third altitude targets one above the other with the target representing the highest altitude above the target representing the lowest altitude, and with the target representing an intermediate altitude positioned between the other two.

23. The method of claim 11, further comprising displaying two of the targets in vertical alignment with each other when the numerical values of the two targets are at least approximately identical.

24. The method of claim 11, further comprising:
receiving an indication that the aircraft is at cruise altitude; and
ceasing to display the third altitude target in response to receiving the indication that the aircraft is at cruise altitude.

25. The method of claim 11, further comprising:
receiving an indication that the aircraft is on a descent from a cruise altitude; and
displaying the second altitude target in a manner different than both the first and third target altitudes in response to receiving the indication that the aircraft is on a descent from a cruise altitude.

26. The method of claim 11, further comprising determining which of the three altitude targets the aircraft is currently being controlled to attain.

27. A method for displaying aircraft flight information, comprising:
receiving a first altitude target from a mode control panel;
receiving a second altitude target from a flight management computer, the flight management computer being configured to store instructions for flight segments to be automatically initiated at future times when the aircraft meets threshold conditions, the second altitude target corresponding to a target cruise altitude;
receiving a third altitude target from the flight management computer, the third altitude target corresponding to an altitude constraint;
displaying the first, second and third altitude targets at least proximate to each other, in order of increasing altitude, with a currently controlling altitude target being displayed in a different manner than an altitude target that is not currently controlling; and presenting a textual indication of whether the aircraft is currently being directed toward an altitude target received from the mode control panel or the flight management computer.

28. The method of claim 27 wherein displaying a target to which the aircraft is currently being controlled in a different manner than a target to which the aircraft is not currently being controlled includes displaying the targets in different colors.

29. A computer-readable medium having contents that perform a method for displaying aircraft control information, comprising:

receiving a first target to which an aircraft will be automatically directed upon authorization from an operator;

receiving a second target to which the aircraft will be automatically directed upon meeting a threshold condition; and displaying the first and second targets at least proximate to each other, with a target to which the aircraft is currently being controlled being displayed in a different manner than a target to which the aircraft is not currently being controlled.

30. The computer-readable medium of claim 29 wherein:

the first target includes a first altitude target received from a mode control panel;

the second target includes a second altitude target corresponding to a cruise altitude received from an flight management computer, and wherein the flight management computer is configured to receive and store instructions for flight segments to be initiated at future times when the aircraft meets threshold conditions; and wherein the method further comprises receiving a third target to which the aircraft will be automatically directed upon attaining a threshold condition, the third target including a third altitude target corresponding to a constraint altitude, the third altitude target being received from the flight management computer; further wherein displaying a target to which the aircraft is currently being controlled in a different manner than a target to which the aircraft is not currently being controlled includes displaying the targets in different colors.

31. The computer-readable medium of claim 29 wherein receiving a first target includes receiving a first altitude target from a mode control panel, and wherein receiving a second target includes receiving a second altitude target from a flight management computer configured to receive and store instructions for flight segments to be initiated at a future time.

32. The computer-readable medium of claim 29 wherein displaying the targets includes displaying the targets on a single display medium.

33. The computer-readable medium of claim 29 wherein receiving the first target includes receiving the first target from an aircraft mode control panel, and wherein receiving the second target includes receiving the second target from a computer-based flight plan.

34. The computer-readable medium of claim 29 wherein displaying a target to which the aircraft is currently being controlled in a different manner than a target to which the aircraft is not currently being controlled includes displaying the targets in different colors.

35. A computer system configured to display aircraft control information, comprising:

a receiver portion configured to receive a first target to which an aircraft will be automatically directed upon authorization from an operator and a second target to which the aircraft will be automatically directed upon attaining a threshold condition; and a display portion operatively coupled to the receiver portion and configured to display the first and second targets at least proximate to each other, with a target to which the aircraft is currently being controlled being displayed in a different manner than a target to which the aircraft is not currently being controlled.

36. The system of claim 35 wherein:

the first target includes a first altitude target received from a mode control panel;

the second target includes a second altitude target corresponding to a cruise altitude received from an flight management computer, and wherein the flight management computer is configured to receive and store instructions for flight segments to be initiated at future times when the aircraft meets threshold conditions; and wherein the receiver portion is configured to receive a third target to which the aircraft will be automatically directed upon attaining a threshold condition, the third target including a third altitude target corresponding to a constraint altitude, the third altitude target being received from the flight management computer; further wherein the display portion is configured to display a target to which the aircraft is currently being controlled in a different color than a target to which the aircraft is not currently being controlled.

37. The system of claim 35 wherein the receiver portion is configured to receive the first target from an aircraft mode control panel and receive the second target from a flight management computer, and wherein the system further comprises:

the mode control panel; and the flight management computer.

38. The system of claim 35 wherein the display portion is configured to display a target to which the aircraft is currently being controlled in a different color than a target to which the aircraft is not currently being controlled.

39. A system for displaying aircraft control information, comprising:

means for receiving a first target to which an aircraft will be automatically directed upon authorization from an operator and a second target to which the aircraft will be automatically directed upon meeting a threshold condition; and means for displaying the first and second targets at least proximate to each other, with a target to which the aircraft is currently being controlled being displayed in a different manner than a target to which the aircraft is not currently being controlled.

40. The system of claim 39 wherein the means for displaying is configured to display the altitude targets in an order determined by a numerical value of each target.

* * * * *